United States Patent [19]

Hirs

[11] 3,925,202

[45] Dec. 9, 1975

[54] METHOD OF AND APPARATUS FOR FILTERING WATER

[75] Inventor: Gene Hirs, Birmingham, Mich.

[73] Assignee: Hydromation Filter Company, Livonia, Mich.

[22] Filed: Apr. 25, 1974

[21] Appl. No.: 464,289

[52] U.S. Cl. .................... 210/32; 210/35; 210/274; 210/275; 210/293
[51] Int. Cl.² ................ B01D 15/06; B01D 23/24
[58] Field of Search .......... 51/303; 210/32, 35, 36, 210/39, 40, 41, 82, 274, 275, 290, 500, 293

[56] References Cited
UNITED STATES PATENTS

| | | | |
|---|---|---|---|
| 2,398,284 | 4/1946 | Briggs | 210/500 X |
| 2,733,138 | 1/1956 | Clark | 51/303 |
| 2,956,682 | 10/1960 | Stephan | 210/82 X |
| 3,436,260 | 4/1969 | Duff | 210/274 X |
| 3,468,422 | 9/1969 | Camp | 210/274 |
| 3,562,153 | 2/1971 | Tully et al. | 210/36 |
| 3,680,701 | 8/1972 | Holca | 210/274 X |
| 3,719,473 | 3/1973 | Waiss, Jr. et al. | 210/39 X |

Primary Examiner—Thomas G. Wyse
Assistant Examiner—Robert H. Spitzer
Attorney, Agent, or Firm—Cullen, Settle, Sloman & Cantor

[57] ABSTRACT

A filtration method and apparatus includes a dual layer filter medium for removing suspended particulate materials and immiscible hydrocarbons, such as tramp oil, from water. The filter layers are comprised of hydrophilic materials having a weak to negative affinity for oil to facilitate the removal of filtered hydrocarbons during backwashing. The first filter medium in the direction of filtration flow is comprised of a granular material having an average filter medium size coarser than 12 mesh; and the second filter medium is comprised of a granular material having an average filter medium size in the range of −16 mesh to +30 mesh to reduce the occurrence of "mudballing" caused by the agglomeration of hydrocarbons with the filter medium material. The two layers are in contact along an interface and are intermixed along that interface so that contaminants can better penetrate into the second filter layer rather than surface load. The filter is backwashed by a procedure employing both scouring air and backwash liquid.

8 Claims, 1 Drawing Figure

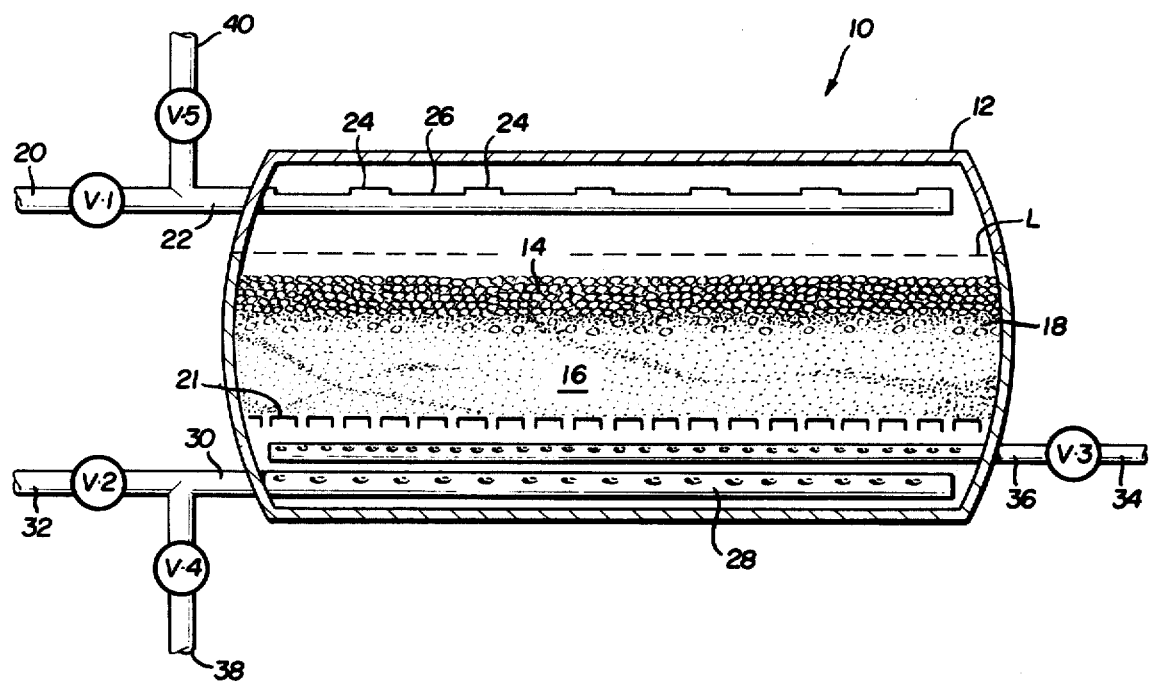

METHOD OF AND APPARATUS FOR FILTERING WATER

BACKGROUND OF INVENTION

1. Field of the Invention

The present invention relates to a method and apparatus for filtering water contaminated by particulate materials and immiscible hydrocarbons, such as tramp oils.

2. The Prior Art

It is well recognized that many industrial processes use huge quantities of water for cooling and other operational purposes. In many instances, as the water circulates through the manufacturing system it picks up contaminant hydrocarbons (tramp oils and greases) from the process machinery along with particulate matter. This is very evident in cooling water used in steel rolling mills. Also in deep well injection systems oil and particulate suspensions must be removed from the water prior to its injection into wells.

Filtration of water contaminated with suspended particulate matter and immiscible hydrocarbons has in the past presented a number of difficulties for in-depth sand filters. The more or less typical sand filter has an average size of filter media finer than 30 mesh. The inlet surface of such a filter is much too closed to permit the penetration of the suspended contaminants. Suspended contaminant hydrocarbons have a tendency to coalesce and agglomerate with the suspended particulate matter. As these agglomerations grow, they accumulate at the inlet surface of the filter, thereby resulting in a surface loading condition which yields very inefficient filter operation.

Further, it is well recognized by those familiar with the art that backwashing of in-depth filters entrained with contaminant hydrocarbons such as tramp oils and greases requires the use of air scouring either preceding or during the actual backwash of the filter bed. This procedure is necessary even though the filter media may be comprised of a hydrophilic or oleophobic material such as silica sand. The contaminant hydrocarbons agglomerate with suspended particulate matter and further agglomerate with the granules of filter medium. This phenomenon is commonly known as "mudballing". Simple backwashing without air scouring will not dislodge the agglomeration of oils, greases, and dirt particles from the filter media. After a period of time a mudball of finer filter media can even become totally unresponsive to backwashing. When this occurs, the filter media must be removed manually and replaced with new media.

There is yet a further problem often encountered in the filtration of water contaminated with suspended hydrocarbons and particulate matter. Filter medium which is of an average size of finer than 30 mesh will be carried out of the filter vessel with the backwash water. The oils and greases which agglomerate with the filter medium granules produce particles having a lesser specific gravity than the sand filter media alone. This increases the buoyancy of the sand particles and permits the backwash water to carry the filter medium out of the retaining vessel. Further, the oil and grease coating of these agglomerations tends to attract air bubbles used in the air scouring. This further lightens the agglomerated particle and promotes the loss of filter medium during backwash.

Several claimed improvements to this type filtration are in use. In one case, the filter medium bed is comprised of large granules of sand having an average size of filter medium in the range of $-6$ to $+12$ mesh. The purpose of using the larger granule filter media is twofold. First, there are fewer fines within the filter medium. This opens the surface of the filter bed for adequate penetration of the suspended contaminants, both particulate contaminants and suspended hydrocarbons. Second, the larger granule media rather effectively resists the agglomerating effect from entrained contaminant hydrocarbons. This eliminates mudballing and promotes the effectiveness of backwashing with air scouring.

Though the filter bed using the larger granule sand effectively counteracts the problems of surface loading and backwashing, the efficiency of filtration is quite low. The filter bed of larger granules simply cannot retain the contaminants to the extent that a bed of finer sand can.

Another attempt at solving this filtration problem calls for the use of a rather common dual media filter. The first or upper layer consists of larger granule anthracite coal and the second or lower layer of finer sand. The upper layer of anthracite coal serves to open the surface of the bed of finer sand to permit the penetration of suspended contaminants. This improves the efficiency of the filter. To this extent such filters are successful. However, anthracite has an affinity for hydrocarbons, which when attached to the anthracite coal lower the specific gravity of the anthracite and promote its loss during backwash. Further, the contaminants which penetrate into the finer sand bed still present the problem of mudballing and agglomeration.

It is thus an object of the present invention to filter water contaminated with suspended particulate matter and immiscible hydrocarbons in an improved manner.

It is a further object of the present invention to use air scouring in conjunction with the backwashing of the filter media bed.

It is yet another, but no less important, object of the present invention to present a filter media bed which is designed to overcome surface loading conditions and promote the penetration of hydrocarbon and particulate contaminants into the filter media bed.

DEFINITION AND EXPLANATION OF TERMS

For purposes of simplifying designations of filter media sizes, all references herein to a particular "mesh" or "mesh size" refer to standard U.S. Sieve Series (also known as U.S. Standard Mesh Sieve size). A designation of a mesh size preceded by a minus ($-$) sign indicates that all granules will pass that size sieve; or on the average are finer than that sieve size when determining an average size of filter medium. A designation of mesh size preceded by a plus ($+$) sign indicates that all granules will be retained on that size sieve; or on the average are coarser than that sieve size when determining an average size of filter medium. For example, a mixture of granular filter media designated $-8$ to $+30$ mesh means all the granules will pass a No. 8 U.S. Sieve Series mesh and all the granules will be retained on a No. 30 U.S. Sieve Series mesh. Stated another way, all the granules are smaller than a No. 8 sieve and larger than a No. 30 sieve.

"Average size" of filter medium is defined as a mathematically derived figure equal to the sum of the individual products of the fraction by weight of each mesh size in a layer of medium multiplied by the respective mesh sizes. For example, in a filter bed consisting of a layer of granulated black walnut shells, having 40% by weight of 6 mesh granules and 60% by weight of 8 mesh granules, and a layer of silica sand, having 50% by weight of 20 mesh, 50% by weight of 30 mesh, the "average size" of filter medium in the respective layers is 7.2 mesh (0.40 × 6 mesh + 0.60 × 8 mesh = 7.2 mesh) and 25.0 mesh (0.50 × 20 mesh + 0.50 × 30 mesh = 25.0 mesh).

References herein to a "distinct" layer of filter media are intended to mean a body of filter material situated in layer fashion so that a substantial part of this material is at a different layer level than a preceeding or succeeding layer of filter media. This does not mean that some intermixing of granules of different layers will not occur, since, as a practical matter, there will always be some mixing at the interface of contacting layers.

SUMMARY OF THE INVENTION

The present application proposes a method and apparatus for filtering liquid contaminated with suspended particulate matter and suspended immiscible hydrocarbons. The filter consists of a bed of granular material comprised of two distinct layers, through which the filtration liquid flows in a vertical, downward direction. The filter media used in both layers is comprised of material having a weak affinity for oil and preferably is oleophobic.

The two layers are in intimate contact and intermix to a certain degree at their contacting interfaces. The top layer of filter medium is comprised of a granular material having an average size coarser than 12 mesh. The lower layer of filter medium is comprised of granular material having an average size in the range of −16 mesh to +30 mesh. Air scouring is used in conjunction with the backwashing of the filter medium bed.

BRIEF DESCRIPTION OF THE DRAWING

The single DRAWING is a schematic representation of a preferred embodiment of the present invention.

DETAILED DESCRIPTION OF THE INVENTION

The present invention includes a filter 10 which is comprised of a pressure vessel 12, an upper layer of granular filter medium 14, a lower layer of granular filter medium 16 and a region of intermixing 18 between the upper and lower layers. The filter medium is supported by a perforate grate 21. Pressure vessel 12 can, quite naturally, be of any desired configuration, but the illustrated embodiment is a cylindrical tank positioned on its side. This configuration permits the most economy of construction, transportion, and shape utilization. Vessel 12 could, for example, be a vertically positioned tank and in some instances may be nonpressurized and open to the atmosphere.

The operation of filter 10 during the filtration cycle is the same as that of conventional in-depth filters. Contaminated liquid enters through line 20, passes through open valve V1 and through line 22, and is distributed within pressure vessel 12 from inlet header 26 through openings 24. The contaminated liquid passes through the various filter media layers 14, 18, 16, through the support grate 21 and then through a perforate outlet header 28, lines 30, 32 and open valve V2. After at least a portion of suspended contaminants have been retained in the filter bed, the flow of contaminated liquid is stopped by closing valves V1 and V2 and the backwash cycle is then initiated.

The backwash cycle may be operated in one of two manners. In the preferred manner, prior to introduction of backwash water, the level of liquid in pressure vessel 12 is lowered to a point about four inches above the top of filter media layer 14, as indicated by the dashed level line L. This is accomplished by opening valves V5 and V2 until the liquid has reached the desired level L. At this point valve V2 is closed and valve V3 is opened. This introduces pressurized air into vessel 12 through line 34 and a perforate air header 36. The air introduced at the bottom of the filter media bed rises rapidly through the support grate 21 and filter medium layers 16, 18 and 14 to scour the bed and dislodges entrapped contaminants.

After a desired period of air scouring, generally on the order of two to three minutes, valve V3 is closed and backwash water is introduced through a line 38, by opening valve V4. The backwash water enters at the base of filter vessel 12 through the perforate header 28 and causes filter bed 16, 18, 14 to expand sufficiently to permit the entrapped contaminants to be carried out through line 22, open valve V5 and line 40 for disposal or further treatment. After the backwash cycle is completed, valves V5 and V4 are closed and the filtration cycle begins anew by opening valves V1 and V2.

A second method of backwashing calls for the introduction of air through line 34 simultaneously with the introduction of backwash liquid through line 38. This, of course, does not require the lowering of the liquid level to line L. Experience has shown, however, that this second method of backwashing is not as satisfactory as the previously described method calling for air scouring prior to the introduction of backwash liquid.

The description of the method and apparatus of filtering to this point is not new, the schematic representation of the filter as shown being well known to those skilled in the art. Likewise, the concept of dual media deep bed filter beds is also well known. In addition, air scouring has been used in the past on numerous occasions to aid in the disloding of entrapped contaminants from a filter bed.

The inventive aspect of what is disclosed in this application lies in the unusual characteristics and the combination of filter medium materials used to filter uniquely difficult contaminants from water. The present invention concerns itself only with the filtration of water contaminated with suspended particulate matter and suspended immiscible hydrocarbons such as tramp oils and greases. Further, the present invention is primarily concerned with the use of a method and apparatus wherein air scouring is used in conjunction with the backwashing or cleansing of the filter medium bed.

The Applicant has discovered that, quite unexpectedly, the affinity between the suspended contaminant hydrocarbons and the granular filter medium plays an extremely important role in the performance of the filter. One would logically expect that the best overall performance of the filter would result from the use of a filter media that had a strong affinity for any suspended contaminant hydrocarbons. However, filter medium material which has anything greater than a weak affinity for hydrocarbons (oils and greases) retains the hydrocarbon contaminants even upon very vigorous backwash with air scouring. The hydrocarbon adhering to oil-attractive material tends to attract air bubbles used in air scouring. This, along with the buoyancy effect of the hydrocarbon itself, tends to cause the filter medium material to float out of the filter vessel during backwash. This phenomenon is experienced when using anthracite coal, which has a strong affinity for hydrocarbons, as the top filter medium layer. The same thing occurs when granular plastic such as polyvinyl chloride is used as a filter medium material.

Applicant discovered that very efficient filtration can be accomplished by using materials that have a weak affinity for hydrocarbons or that are actually oleophobic. In the preferred embodiment such materials comprise granular black walnut shells for layer 14 and silica sand for layer 16. Carbonacious materials with properties similar to black walnut shells are particularly suited for use as the top layer of filter medium. Another such material is apricot pits. Garnet is another material having the filtering characteristics desired by the present invention for utilization in the lower filter layer; however, the high specific gravity of garnet detracts from its preference of use. Other media for use in the second layer will become apparent to those skilled in the art of filtration.

The weak or negative affinity that the respective layer materials have for hydrocarbon does not materially affect filtration efficiency, as the hydrocarbons tend to become entrapped in both the upper and lower layers of filter medium rather than being absorbed. This particular mode of filtration, then, enables entrapped hydrocarbon contaminants to dislodge quite readily from these materials with an air-scour backwash.

It is very important that both layers of filter medium be comprised of materials which have a weak to negative affinity for hydrocarbons. It is this combination of filter medium material which permits the use of a very economical filter bed and filter vessel design. In the preferred embodiment filter bed 14, 16, 18 will not exceed 48 inches in depth and ideally will be 42 inches in depth, with layers 14 and 16 being approximately 6 inches and 36 inches, respectively. Further, vessel 12 will in preferred embodiment be comprised of a circular tank positioned horizontally, as shown in the drawing, to increase the inlet surface area of the filter medium layers.

The key to this economy lies in the properly sized filter medium materials, and the selection of these sizes turns on the use of two layers of material which have a negative or weak affinity for hydrocarbons. The Applicant has also discovered, quite unexpectedly, that it is only within a very narrow range of filter medium size that adequate filtration efficiency will be found. It has been determined that layer 14 must have an average size of filter medium coarser than 12 mesh and that layer 16 must have an average size of filter medium in the range of −16 mesh to +30 mesh. The most ideal average mesh size for the medium of layer 14 is −6 mesh to +8 mesh, since its primary function is not filtration but to open up the filtration surface of the lower layer 16.

The critical aspect of the average size of filter medium material is illustrated by the following comparison of test results. Three separate combinations of sand and black walnut shells were tested. In all cases the top layer, corresponding to layer 14 on the drawing was comprised of 6 inches of granular black walnut shells in the size range of −6 to +12 mesh. The bottom layer, corresponding to layer 16 on the drawing, was comprised of silica sand. The various size compositions of this layer for the three filters is shown on the table following.

| Filter medium particle size U.S. Sieve Series | | | Percent by weight Silica Sand | | |
|---|---|---|---|---|---|
| | | | Filter No. 1 | Filter No. 2 | Filter No. 3 |
| | +8 | mesh | 0 | 0 | |
| −8 | +12 | '' | 0 | 14.6 % | |
| −12 | +14 | '' | 0 | 42.6 % | |
| −14 | +16 | '' | 0 | 25.8 % | 0 |
| −16 | +20 | '' | 17.0 % | 15.8 % | 50.0 % |
| −20 | +30 | '' | 42.6 % | 1.2 % | 50.0 % |
| −30 | +40 | '' | 25.4 % | 0 | 0 |
| −40 | | '' | 15.0 % | | |

The water which was filtered contained 100 ppm (parts per million) of particulate contaminants of a size finer than 200 mesh. The water also contained 75 ppm of 300 SSU (Second Saybolt Universal) oil as hydrocarbon contaminants. The filtration flow rate was 12 gpm (gallons per minute) per square foot of filter bed inlet surface area. The backwash flow rate was sufficient to produce 25% to 30% expansion of the filter bed. In all cases backwashing was preceded by air scouring of the filter bed for 2 to 3 minutes under 5 psi of pressure.

Filter No. 1 operated for 6 hours and developed 5 psi pressure differential across the filter bed. Composite filter effluent contained less than 1 ppm of suspended contaminants. Backwashing was a problem. The fine sand grains, oil and dirt combined to form a large mudball condition that was not adequately broken up on backwash.

Filter No. 2 operated for 6 hours and developed less than 2 psi pressure differential across the filter bed. However, the composite filter effluent contained about 25 ppm of suspended contaminants. The filter backwashed very easily, with no evidence of mudballing.

Filter No. 3 operated for 6 hours and developed a 4 psi pressure differential across the bed. The composite filter effluent contained less than 2 ppm of suspended contaminants. The filter bed backwashed very easily with no sign of mudballing.

The results of these tests clearly show that it is important that the filter medium granules be not so small so as to promote a mudballing effect through agglomeration of hydrocarbons within the filter medium. Also it is important that the medium granules be not so large so as to reduce the filtration efficiency of the filter bed.

The particularities of the present disclosure are merely exemplary of the present invention and are not intended to be limiting in any sense. The invention embraces all innovations and modifications which will become apparent to those skilled in the art. For example, the specific examples of the materials set forth as being suitable for use in the present invention may be substituted by other materials having a weak to negative affinity for hydrocarbons.

Therefore, having fully and completely set forth my invention, I now claim:

1. In a filter for reducing the agglomeration of hydrocarbons such as tramp oils with particulate contaminants and filter medium granules, including vertically spaced inlet and outlet conduits, a filter bed interposed between said conduits comprising vertically superimposed, upper and lower granular filter medium layers, and means for backwashing said filter with backwash water and pressurized air, the improvement of said filter medium layers being comprised of hydrophilic materials having a weak to negative affinity for hydrocarbons, the material of said upper layer consisting essentially of particulate granulated black walnut shells having an average size of between about −6 to +12 mesh and the material of said lower layer consisting essentially of particulate sand medium having an average size in the range of between about −16 mesh and +30 mesh, said layers being in contact and being intermixed along the contacting interface and said upper layer having a depth for sufficient intermixing to facilitate the penetration of said lower layer by contaminants, and means flowing water contaminated with suspended particulate matter and immiscible tramp oils through said inlet and into the upper filter medium layer, wherein the water flows through the filter medium for the removal of at least a major portion of the contaminated particulate matter and the immiscible tramp oils.

2. The filter as defined in claim 1, characterized by the layer of granulated black walnut shells consisting of an average size in the range of between −6 mesh and +8 mesh.

3. The filter as defined in claim 2, characterized by said filter medium being housed in an elongated cylindrical filter vessel having a horizontally oriented longitudinal axis, and the interface between said filter medium layers being parallel to the vessel longitudinal axis.

4. In a filter assembly for removing particulate contaminants and immiscible hydrocarbons from water, said assembly including first and second filter medium layers, said layers being in contact and being serially arranged in the direction of filtration flow, means for flowing liquid contaminated with particulate contaminants and tramp oil into said filter at a rate sufficient (a) to flow the contaminated liquid downwardly into and through both the upper and lower layers, (b) to enable the removal of contaminants in the lower layer, and (c) to flow the liquid from the lower layer as a clarified filtrate, and means for backwashing said filter layers with backwash liquid and pressurized air, said backwashing means flowing liquid through the filter layers at a rate sufficient to expand the layers and remove accumulated contaminants, the improvement of both said medium layers being comprised of hydrophilic materials having a weak to negative affinity for tramp oils to facilitate the removal of filtered tramp oils during backwash, the material of the first layer in the direction of filtration flow consisting essentially of granulated black walnut shells having an average filter medium size in the range of between about −6 and +12 mesh, and the material of the second layer in the direction of filtration flow consisting essentially of silica sand having an average filter medium size in the range of −16 to +30 mesh to reduce "mudballing" caused by agglomeration of tramp oils with filter medium and particulate contaminants, and said layers being intermixed in the vicinity of the contacting interface between the layers to enhance the penetration of contaminants into said second medium layer.

5. The filter assembly as defined in claim 4, wherein said filter medium layers are vertically aligned for filtration flow sequentially through said first and second layers, the further improvement of said medium layers being housed in an elongated cylindrical filter vessel having a horizontally oriented longitudinal axis to accommodate increasing the filtration inlet surfaces of said filter medium layers.

6. In a method of filtering suspended particulate contaminants and immiscible tramp oils from water, the steps of:
   1. flowing water contaminated by said particulate contaminants and tramp oils into and through a filter bed including upper and lower medium layers at a rate sufficient (a) to flow the contaminated liquid downwardly into and through both the upper and lower layers, (b) to enable the removal of contaminants in the lower layer, and (c) to flow the liquid from the lower layer as a clarified filtrate, said lower medium being comprised of granular sand filter media having an average filter medium size in the range of −16 mesh to +30 mesh to reduce mudballing and said upper medium being comprised of granular black walnut shells having an average filter medium size between about −6 and +12 mesh, said layers contacting and being intermixed in the region of the contacting interface, and said upper medium layer having a depth sufficient for adequate intermixing for improved penetration by contaminants into said lower layer;
   2. during the performance of Step (1), penetrating said lower medium layer by at least a portion of the particulate contaminants and tramp oils in the flow of water and removing at least a portion of said contaminants from the flow of contaminated water by said lower filter medium layer;
   3. terminating the flow of contaminated liquid after said filter medium has removed at least a portion of the contaminants from the filtration flow;
   4. regenerating said filter bed by introducing (a) pressurized gas to scour the bed and (b) backwash fluid for expanding the bed and removing accumulated contaminants; and
   5. terminating the introduction of pressurized gas and backwash liquid.

7. The method as defined in claim 6, characterized by simultaneously introducing said gas and backwash liquid into said filter medium.

8. The method as defined in claim 6, characterized by introducing pressurized gas into said filter medium prior to the introduction of backwash liquid to dislodge the contaminants from said filter medium.

* * * * *